US011988740B2

(12) United States Patent
Esmail

(10) Patent No.: US 11,988,740 B2
(45) Date of Patent: May 21, 2024

(54) MILLIMETER WAVELENGTH RADAR ANTENNA FOR DRONE INTERCEPTION

(71) Applicant: Anduril Industries Inc., Irvine, CA (US)

(72) Inventor: Adnan Esmail, Los Angeles, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 118 days.

(21) Appl. No.: 17/014,686

(22) Filed: Sep. 8, 2020

(65) Prior Publication Data

US 2022/0075056 A1     Mar. 10, 2022

(51) Int. Cl.

| | |
|---|---|
| *G01S 13/90* | (2006.01) |
| *G01S 7/40* | (2006.01) |
| *G01S 13/933* | (2020.01) |
| *H01Q 1/28* | (2006.01) |

(52) U.S. Cl.
CPC ............. *G01S 13/90* (2013.01); *G01S 7/40* (2013.01); *G01S 13/933* (2020.01); *H01Q 1/28* (2013.01)

(58) Field of Classification Search
CPC ...... G01S 13/42; G01S 13/4463; G01S 13/90; G01S 13/933; G01S 7/40; G01S 7/2813; H01Q 1/00; H01Q 1/28; H01Q 21/061
See application file for complete search history.

(56) References Cited

U.S. PATENT DOCUMENTS

| | | | | |
|---|---|---|---|---|
| 5,172,119 A | * | 12/1992 | Young | G01S 13/90 |
| | | | | 342/25 A |
| 6,778,148 B1 | * | 8/2004 | Pack | H01Q 21/22 |
| | | | | 343/895 |
| 9,716,309 B1 | * | 7/2017 | ElSallal | H01Q 13/085 |
| 10,365,364 B1 | * | 7/2019 | Prados | G01S 13/865 |
| 11,435,435 B2 | * | 9/2022 | Kim | H01Q 21/06 |
| 2005/0122249 A1 | * | 6/2005 | Grudkowski | H01Q 3/04 |
| | | | | 342/179 |
| 2010/0007555 A1 | * | 1/2010 | Ezal | H01Q 25/00 |
| | | | | 342/417 |
| 2012/0081247 A1 | | 4/2012 | Kemkemian | |
| 2013/0106647 A1 | * | 5/2013 | Yu | G01S 13/4463 |
| | | | | 342/113 |
| 2014/0269856 A1 | * | 9/2014 | Gianvittorio | H01Q 1/02 |
| | | | | 375/219 |
| 2016/0178410 A1 | * | 6/2016 | Bishop | G01D 11/245 |
| | | | | 250/239 |

(Continued)

FOREIGN PATENT DOCUMENTS

| | | | | |
|---|---|---|---|---|
| CN | 104375145 A | * | 2/2015 | ............. G01S 13/90 |
| CN | 103548205 | | 2/2017 | |

(Continued)

OTHER PUBLICATIONS

CN_104375145_A_I.pdf, machine translation of CN-104375145-A (Year: 2015).*

(Continued)

*Primary Examiner* — Timothy A Brainard
*Assistant Examiner* — Kenneth W Good
(74) *Attorney, Agent, or Firm* — Van Pelt, Yi & James LLP

(57) ABSTRACT

A system for drone radar includes an antenna array. The antenna array includes an arc configuration. A set of transmitter antennas and a set of receiver antennas are arranged in an arc along the arc configuration.

19 Claims, 11 Drawing Sheets

(56) References Cited

U.S. PATENT DOCUMENTS

2017/0029107 A1    2/2017  Emami
2020/0295453 A1*  9/2020  Kuo .................... H01L 23/3128
2020/0335865 A1*  10/2020  Greve ....................... H01P 5/12
2021/0135373 A1*  5/2021  Spielmann ............. H01Q 1/523

FOREIGN PATENT DOCUMENTS

| CN | 208299053 U | * 12/2018 |
|----|-------------|-----------|
| EP | 3572838 | 11/2019 |
| JP | 2017534881 | 11/2011 |
| JP | 2016166859 | 9/2016 |

OTHER PUBLICATIONS

17014686_2023-05-15_CN_208299053_U_M.pdf, machine translation of CN_208299053_U (Year: 2018).*

* cited by examiner

MILLIMETER WAVELENGTH RADAR ANTENNA FOR DRONE INTERCEPTION

BACKGROUND OF THE INVENTION

Drones have become prevalent and are capable of carrying payloads such as cameras and improvised explosive devices that can be misused. It is difficult to detect and determine that a drone is a threat, much less intercept the drone once it has been determined to be a problem.

BRIEF DESCRIPTION OF THE DRAWINGS

Various embodiments of the invention are disclosed in the following detailed description and the accompanying drawings.

DETAILED DESCRIPTION

Figure 1A:
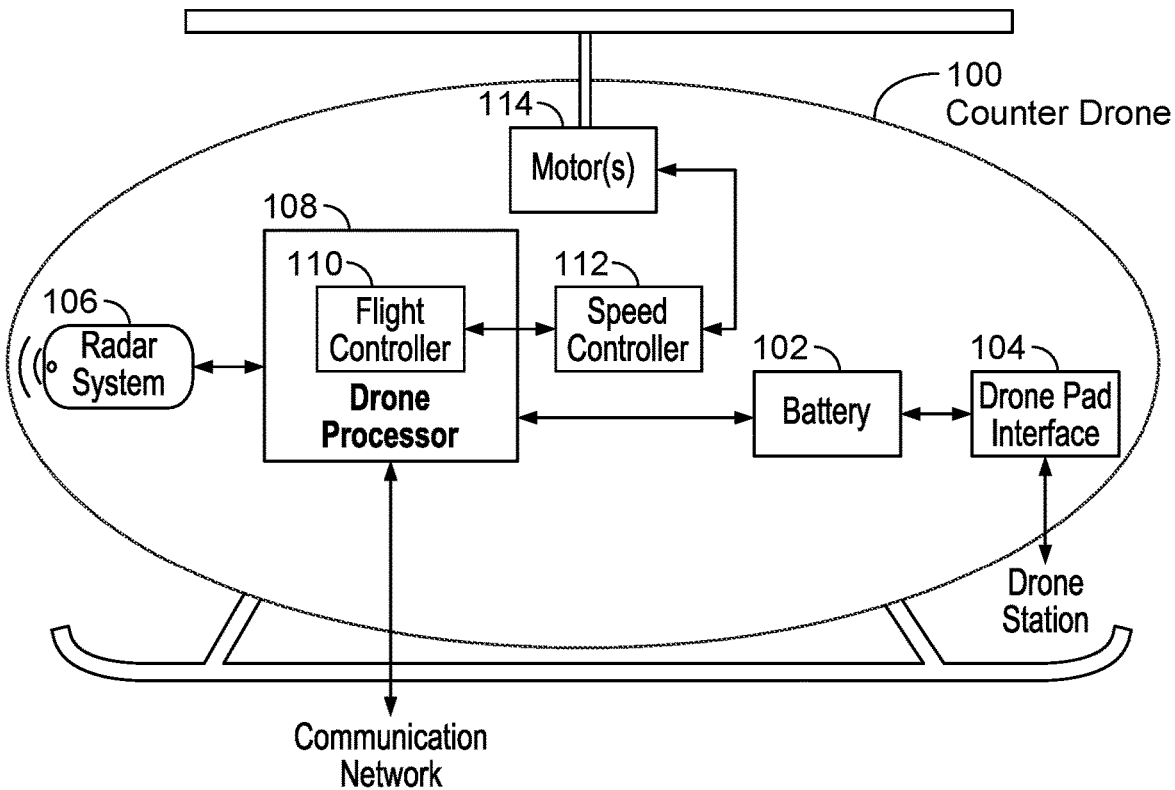
FIG. 1A is a block diagram illustrating an embodiment of a counter drone.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for drone radar is disclosed. The system comprises an antenna array. The antenna array comprises an arc configuration. A set of transmitter antennas and a set of receiver antennas are arranged in an arc along the arc configuration.

A system for calibrating a radar is disclosed. The system comprises an antenna array and a processor. The antenna array comprises an arc configuration. The processor is configured to calibrate the drone radar. Calibrating comprises causing a transmitter of the antenna array to transmit towards a single target; measuring a signal at each receiver in each arc configuration of the antenna array to determine a phase offset of each receiver as paired with the transmitter, and determining a transmitter-receiver pair calibration for the antenna array.

The drone radar system is small enough to mount on an unmanned aerial vehicle (UAV) (e.g., a counter drone) and is able to detect targets with a low radar cross section (RCS) (e.g., an RCS of −20 dBsm). For example, the system has sufficient field of view (FOV) (e.g., 60 degrees by 60 degrees) to provide for the pursuit and capture of an incoming threat drone, while the counter drone is pitching and rolling in pursuit, from the edge of its defined detection range (e.g., 100 meters) right up to the target.

In various embodiments, configurations are narrow or wide depending on system requirements. In various embodiments, the radar sensing system is fixed with a wider FOV, is gimbaled with a narrower FOV (e.g., narrower than 60 degrees by 60 degrees) that is mechanically steered, is narrower (e.g., narrower than 60 degrees by 60 degrees) and steered electronically (e.g., using an active electronically scanned array), or any other appropriate configuration.

Narrower FOV configurations that achieve greater range would come at the cost of greater complexity in-flight search algorithms that impair evasive pursuit, or require a gimbal needing high pointing accuracy, controllability-at-speed, reliability, and an additional burden of complexity.

The system exhibits high angular accuracy and increased range over existing radar systems capable of being flown aboard a counter drone. In some embodiments, the system has sufficiently high angular resolution to provide for discriminating multiple threat drones in the presence of multiple counter drones. In some embodiments, the radar is used for imaging of the targets as resolution is sufficient to develop an image of detections.

In some embodiments, the system for drone radar comprises a millimeter wavelength radar. In some embodiments, the system for drone radar comprises a phased array radar (e.g., multiple-input multiple-output (MIMO) radar).

Due to spatial constraints within the counter drone, radio frequency (RF) generation and detection, interfacing, and signal processing circuit boards of the system for drone radar comprise a modular hardware architecture to provide flexibility of design. In some embodiments, the first modular circuit board comprises the antenna array and analog radar processors (e.g., an RF antenna circuit board with integrated waveguides and RF processing). In some embodiments, a first modular circuit board integrates millimeter wavelength RF and signal processing in a complementary metal-oxide semiconductor (CMOS) process. In some embodiments, a second modular circuit board comprises a field programmable gate array (FPGA) interlink board. In various embodiments, an application-specific integrated circuit (ASIC) is used for one or more of the FPGAs on the FPGA interlink board. For example, the use of an ASIC as a drop-in replacement to an FPGA provides for power reduction and/or saving circuit board space. In some embodiments, a third modular circuit board comprises a digital radar processor board (e.g., a MIMO processing board).

The antenna array comprises a set of transmitter antennas and a set of receiver antennas arranged in one or more arc configurations. The antenna arc configurations describe a non-uniform configuration for arranging the transmitters and receivers to provide increased drone radar system resolution over typical uniform array configurations used in synthetic-aperture radar (SAR). The disclosed non-uniform arc configurations provide an increase in resolution by suppressing grating side lobe interference compared to standard arrays (e.g., linear transmitter and/or receiver arrays). The one or more shapes of the arc configurations are selected to achieve design specifications for a wide FOV and improved resolution of elevation and azimuth angles compared to commercially-available radar systems suitable for use in a counter drone.

FIG. 1A is a block diagram illustrating an embodiment of a counter drone. In the example shown, counter drone 100 resides in or on a drone station (not shown) and receives counter drone instructions via a communication network. Battery 102 receives charging current via drone pad interface 104 (e.g., drone pad interface 104 comprises a hardwire connection or an electromagnetic inductive coupling to the drone station).

In some embodiments, counter drone 100 is part of a counter drone system that includes a network that ties one or more sensor systems (e.g., sensor systems in stations, towers, drones, drone stations, mounted on vehicles, mounted on humans, etc.) and one or more counter drone stations together to monitor and protect a geo-fenced area against incoming threat drones. The sensor systems, in coordination with the network, provide raw and/or derived sensor information to aid in determining which counter drone(s) to launch and/or direct (e.g., if already in flight) in response to an incoming threat drone(s), based on the available and desired counter drone properties (e.g., battery levels, payload(s), etc.), and in consideration of intercept probabilities.

In an example of counter drone 100 being deployed to intercept a threat drone, radar system 106 provides raw data and/or derived sensor information (e.g., a radar image) to drone processor 108 (e.g., to aid in determining an intercept flight path). In some embodiments, radar system 106 provides raw data and/or derived sensor information to the counter drone system via drone processor 108 to a communication network (e.g., to communicate threat drone position, altitude, velocity, acceleration, and/or trajectory).

Drone processor 108 sends intercept flight path information to flight controller 110 which in turn activates and controls counter drone motor(s) 114 via speed controller 112 to achieve liftoff. Flight controller 110 comprises a processor, a gyro, an accelerometer, an altitude sensor (e.g., a barometer), a current sensor, a proportional-integral-derivative (PID) controller (e.g., to maintain counter drone 100 stability during flight), and other such components as standard and customary to allow flight controller 110 to navigate and maintain proper course for threat drone interception.

Figure 1B:
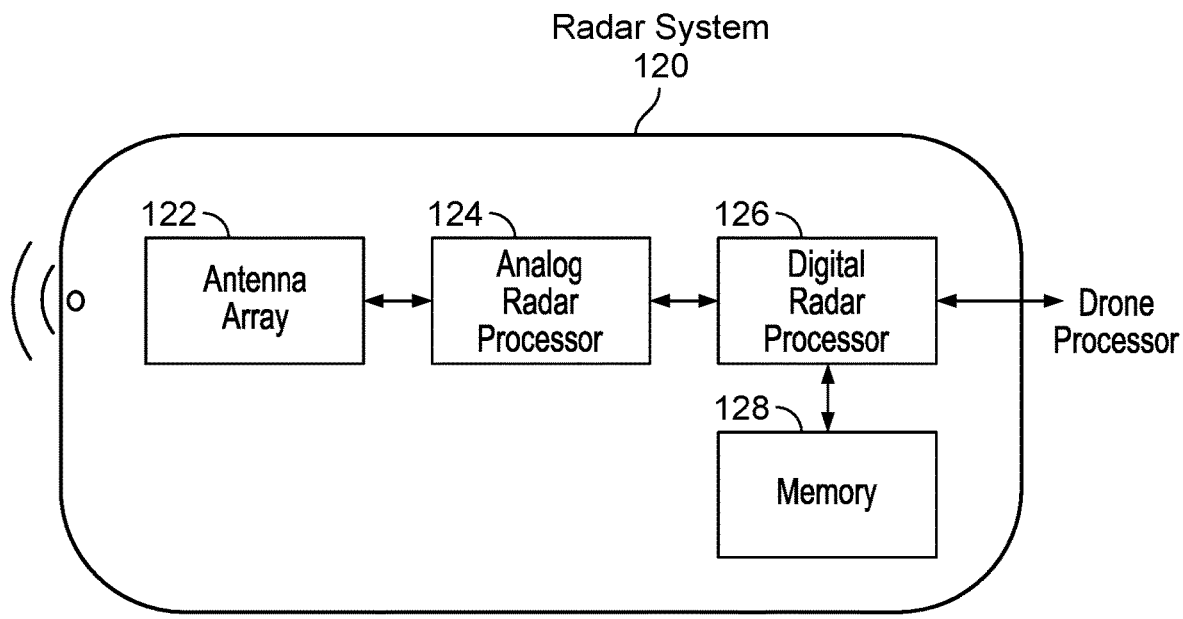
FIG. 1B is a block diagram illustrating an embodiment of a radar system.

FIG. 1B is a block diagram illustrating an embodiment of a radar system. In some embodiments, radar system 120 of FIG. 1B is used to implement radar system 106 of FIG. 1A. In the example shown, radar system 120 comprises antenna array 122, analog radar processor 124, digital radar processor 126, and memory 128. Analog radar processor 124 receives a mm-wave signal (e.g., a radar frequency between 30 to 300 GHz) from antenna array 122 and downmixes the mm-wave signal to produce an intermediate-frequency (IF) input to digital radar processor 126 (e.g., a frequency in the range 250 KHz to 5 MHz). For example, a mm-wave signal is transmitted by antenna array 122, reflected from a target of interest, and received by antenna array 122 for downmixing and producing an IF input to digital radar processor 126. Analog radar processor 124 digitizes the IF signal (e.g., using an analog-to-digital converter). Digital radar processor 126 calculates the amplitude and phase of the IF signal and determines the elevation angle and azimuth angle of the target of interest (e.g., an incoming threat drone) as well as the distance to the target of interest. Memory 128 stores raw sensor data and/or derived sensor information (e.g., from digital radar processor 126), or any other appropriate information to facilitate operation of radar system 120.

Figure 2A:
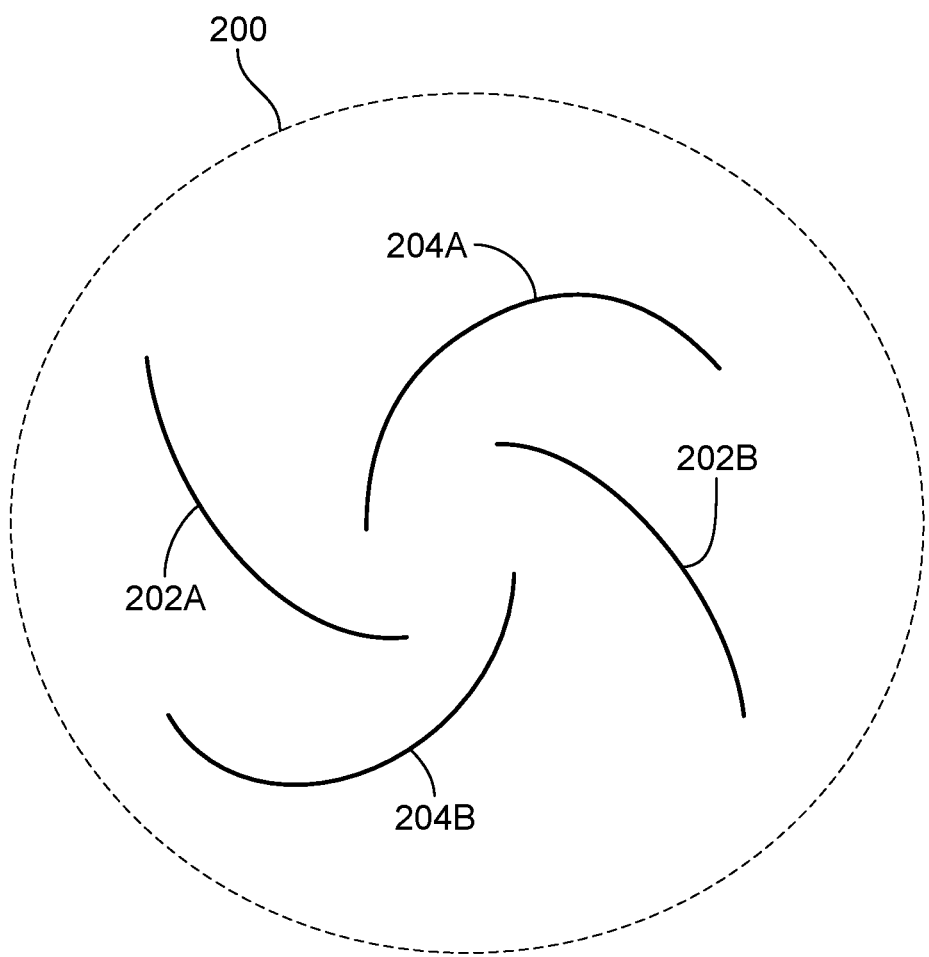
FIG. 2A is a block diagram illustrating an embodiment of an antenna array.

FIG. 2A is a block diagram illustrating an embodiment of an antenna array. In some embodiments, antenna array 200 of FIG. 2A is used to implement antenna array 122 of FIG. 1B. In the example shown, antenna array 200 comprises a pair of antenna arc configurations of one type (e.g., antenna arc 202A and antenna arc 202B) and a pair of antenna arc configurations of another type (e.g., antenna arc 204A and antenna arc 204B). In some embodiments, antenna array 200 includes a plurality of arc configurations. The antenna arc configurations of each type describe a non-uniform configuration for arranging the transmitters and receivers that comprise antenna array 200. In contrast, the transmitters and receivers of a standard virtual antenna array used in synthetic-aperture radar (SAR) (e.g. an economical SAR system capable of being used on a counter drone) are commonly arranged in a uniform configuration (e.g., linearly).

The number of virtual channel elements in a SAR system is the product of the number of transmitters and the number of receivers used to create the array. For example, an antenna array comprising 12 transmitters and 16 receivers provides 192 virtual channel elements. A virtue of the large number of virtual channel elements used in SAR is that it produces low beam widths (i.e., it provides increased resolution over non-SAR systems). Further resolution improvement is achieved by using a non-uniform configuration.

The non-uniform arc configuration of FIG. 2A provides an increase in resolution by suppressing grating side lobe interference. The low beam widths of SAR come at the expense of grating side lobes (i.e., secondary intensity peaks away from the beam center). The secondary intensity peaks are of sufficient intensity as to create ambiguity in determining target location (e.g., confusing the location of the center of the beam with the location of the secondary intensity peaks). In the disclosed system for drone radar, the arc configurations shown in FIG. 2A suppress grating side lobe intensities resulting in increased system resolution compared to uniform array configurations (e.g., providing 3 to 4 degrees of resolution compared to 5 to 7 degrees of resolution otherwise).

In some embodiments, the azimuth resolution and the elevation resolution are less than 6 degrees in order to resolve targets according to system requirements. In some embodiments, the azimuth resolution and the elevation resolution are less than 4 degrees full-width at half-maximum (FWHM) in order to resolve targets according to system requirements. In some embodiments, the azimuth resolution and the elevation resolution are as high as than 18 degrees, but depends on the system requirements for separating multiple potential targets. In some embodiments, an azimuth resolution of the antenna array and an elevation resolution of the antenna array are within +/−50% of each other. In some embodiments, an azimuth resolution of the antenna array and an elevation resolution of the antenna array are approximately equivalent (e.g., within +/−1%, 5%, 10% of each other). In some embodiments, angular accuracy is less than 1.5 degrees measured at a 10 dB signal-to-noise ratio (SNR). In some embodiments, range resolution is less than 0.2 meters with a range capability of 70 meters for a target with an RCS of −10 dBsm. In some embodiments, the system achieves a range of 120 m with a resolution of 0.1 m for an RCS of −20 dBsm.

In various embodiments, the system performance characteristics can vary depending on various parameters that are software defined. These parameters can change the range, range resolution, Doppler, Doppler resolution, power reflected/SNR, and various waveform and beam characteristics. Developing a waveform, also known as a chirp configuration, for an application involves a complex trade-off across various parameters to achieve sufficient coverage of the use case (e.g., to be able to detect a very tiny target, going X speed, at Y range, with Z other targets in the field of regard, etc.).

Figure 2B:
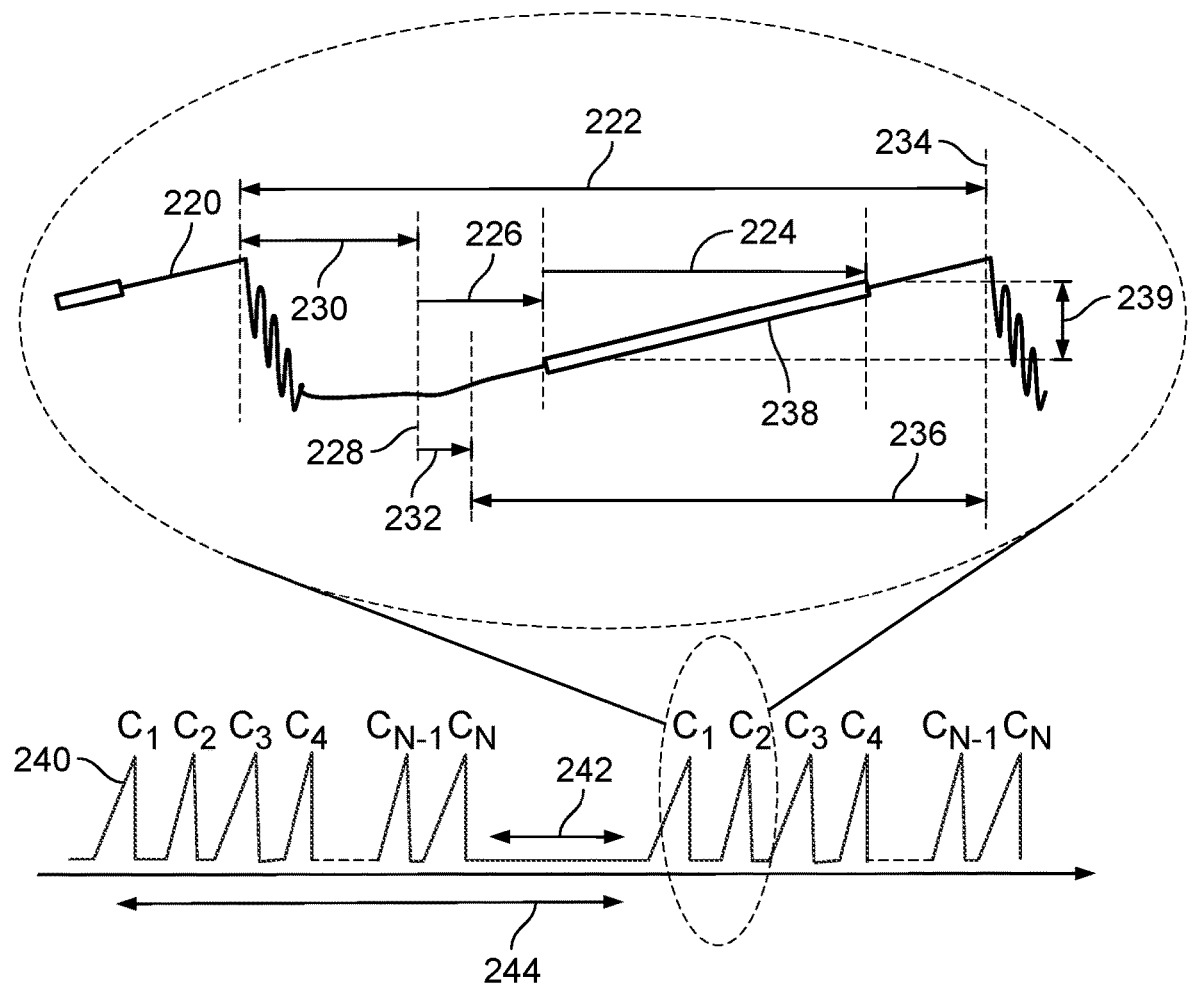
FIG. 2B is a diagram illustrating an embodiment of a waveforms associated with parameters.

FIG. 2B is a diagram illustrating an embodiment of a waveforms associated with parameters. In some embodiments, the waveform is a radar waveform of a radar system (e.g., radar system 106 of FIG. 1). In the example shown, multiple waveform chirp ramps of a frame are displayed in waveform 240 with frequency represented along the y axis and time along the x axis. Waveform 240 includes chirp ramps $C_1, C_2, C_3, C_4, \ldots, C_{N-1}, C_N$ of frame period 244 are spaced by inter frame time 242 from chirp ramps $C_1, C_2, C_3, C_4, \ldots, C_{N-1}, C_N$.

Waveform 220 shows an enlarged diagram of a chirp ramp. Waveform 220 includes indications of chirp cycle time 222, analog to digital converter (ADC) sampling window 224, ADC start 226 from ramp start 228, idle time 230 from ramp end 234 to ramp start 228, transmit start 232 from ramp start 228, and transmitter on 236 during which the frequency is ramping at frequency slope 238 over sweep bandwidth 239.

In various embodiments, the base parameters include: valid sweep bandwidth (e.g., sweep bandwidth 239 of 3000 MHz), initial ramp slope (e.g., 65.97 MHZ/us), ramp slope parameter (e.g., 1366), ramp slope (e.g., frequency slope 238 of 65.95 MHz/us), inter-chirp time (e.g., idle time 230 of 20.20 us), chirp time (e.g., 45.48 us), number of samples per chirp (e.g., 223), maximum beat frequency (e.g., 4.4 MHz), sampling frequency minimum (4.89 Msps), total sweep bandwidth (e.g., 3881.04 MHz), carrier frequency (e.g., 77.80 GHz), lambda (e.g., 3.86 mm), idle time minimum (e.g., idle time 230 of 7 us), ramp end time (e.g., ramp end 234 of 58.85), ADC valid start time minimum (e.g., ADC start 226 of 6 us), maximum chirp repetition period (e.g., 133.50 us), chirp repetition period (e.g., chirp cycle time 222 of 131.70 us), number of range FFT bins (e.g., 256), minimum number of chirp loops (e.g., a number of frame period s such as frame period 244—for example, 27), number of Doppler FFT bins (e.g., 32), active frame time (e.g., 4.21 ms), range interbin resolution (e.g., 4.36 cm), velocity interbin resolution (e.g., 0.47 m/s), radar cube size (216 KB), or any other appropriate parameters.

In some embodiments, other parameters are varied for interfacing across radar chips and modulating in multiphase configurations. In some embodiments, the waveform is customized to the desired system performance characteristics.

Figure 2C:
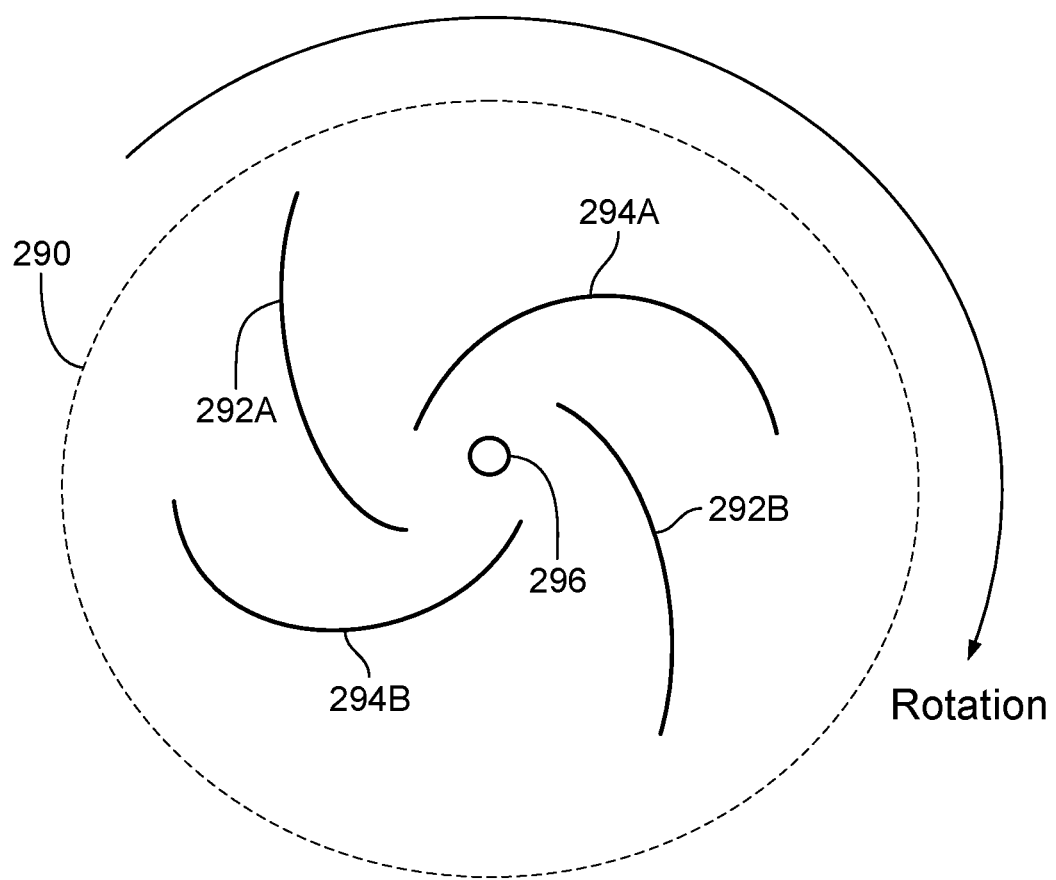
FIG. 2C is a block diagram illustrating an embodiment of a rotated set of antenna arcs.

FIG. 2C is a block diagram illustrating an embodiment of a rotated set of antenna arcs. In some embodiments, antenna array 290 of FIG. 2C is used to implement antenna array 122 of FIG. 1B. In the example shown, antenna arc 292A and antenna arc 292B comprise a pair of antenna arcs of one type and antenna arc 294A and antenna arc 294B comprise a pair of antenna arcs of another type. The positions of antenna arc 292A and antenna arc 292B are such that they are positioned in a manner that in the event that antenna arc 292A is rotated 180 degrees about center 296, antenna arc 292A would overlap antenna arc 292B and similarly antenna 292B would overlap antenna arc 292A. The positions of antenna arc 294A and antenna arc 294B are such that they are positioned in a manner that in the event that antenna arc 294A is rotated 180 degrees about center 296, antenna arc 294A would overlap antenna arc 294B and similarly antenna arc 294B would overlap antenna arc 294A. The positions of the antenna arcs of antenna array 290 are positioned with rotations about center point 296 to achieve minimal grating sidelobe interference. Antennas of the antenna array are positioned to achieve a specified FOV and resolution. In some embodiments, an azimuth field of view of the antenna array and an elevation field of view of the antenna array are within +/−10% of each other. In some embodiments, the system has an elevation FOV of 20 degrees and an azimuth FOV of 60 degrees. In various embodiments, the azimuth field of view and the elevation field of view are approximately 40, 60, or 80 degrees, or any other appropriate field of view.

In some embodiments, the plurality of arc configurations of antenna array 290 comprise a set of similar arc configurations rotated around center point 296. In some embodiments, the plurality of arc configurations of antenna array 290 includes pairs of L types of arc configurations, where L is an integer. In some embodiments, a first pair of a first type of arc configuration of the L types of arc configurations of antenna array 290 are positioned rotated around center point 296. In some embodiments, a second pair of a second type of arc configuration of the L types of arc configurations of antenna array 290 are positioned rotated around center point 296. In some embodiments, the first pair of the first type and the second pair of the second type are positioned with a 90 degree rotation between each other.

Figure 3A:
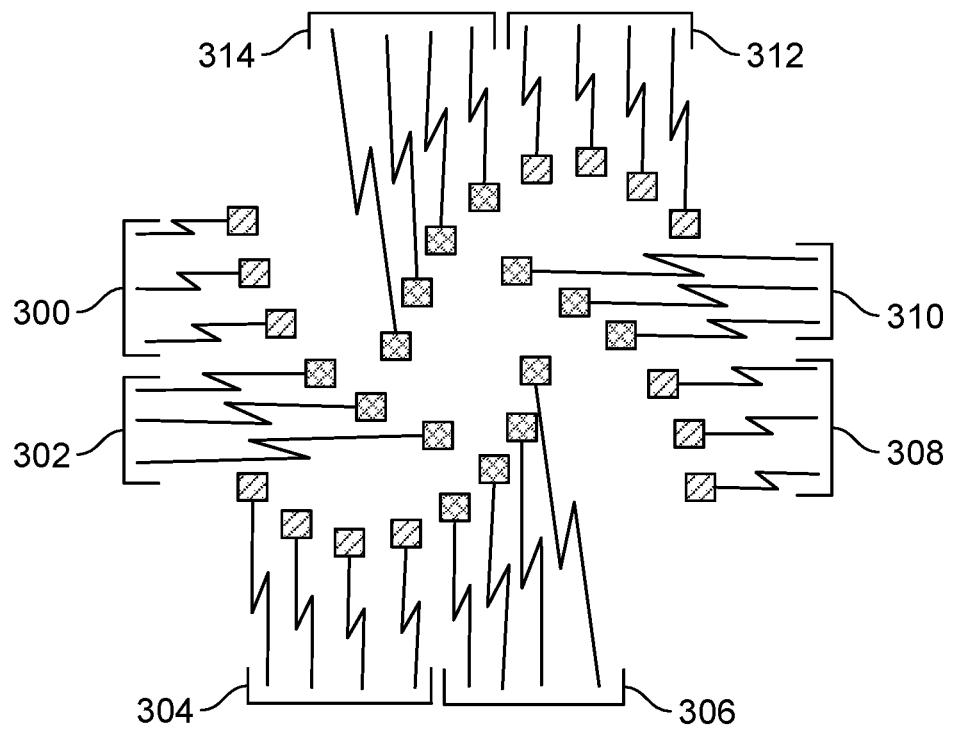
FIG. 3A is a block diagram illustrating an embodiment of an antenna array.

FIG. 3A is a block diagram illustrating an embodiment of an antenna array. In the example shown, the antenna array of FIG. 3A comprises two types of antenna arcs and two types of antennas (i.e., Type A and Type B). In the example shown, a first type of antenna arc is formed by Type A antennas 300 and Type B antennas 302 and a second type of antenna arc is formed by Type A antennas 304 and Type B antennas 306. Type A antennas 308 and Type B antennas 310 form the first type of antenna arc rotated by 180 degrees around a center point relative to the antenna arc formed by Type A antennas 300 and Type B antennas 302. Type A antennas 312 and Type B antennas 312 form the second type of antenna arc rotated by 180 degrees around a center point relative to the antenna arc formed by Type A antennas 304 and Type B antennas 306. In some embodiments, Type A antennas are transmitter antennas and Type B antennas are receiver antennas. In some embodiments, Type A antennas are receiver antennas and Type B antennas are transmitter antennas. In various embodiments, the set of transmitter antennas comprises N transmitter antennas and the set of receiver antennas comprises M receiver antennas, wherein M and N are integers (e.g., N is three or four and/or M is three or four). In some embodiments, N and M are integers that are equal. In various embodiments, N is 1, 2, 3, 4, 5, 6, 7, 8, 9, 10, 20, 30, 40, 50, or any other appropriate number. In various embodiments, M is 1, 2, 3, 4, 5, 6, 7, 8, 9, 10, 20, 30, 40, 50, or any other appropriate number. Antennas of the antenna array are positioned to achieve a specified FOV and resolution.

Figure 3B:
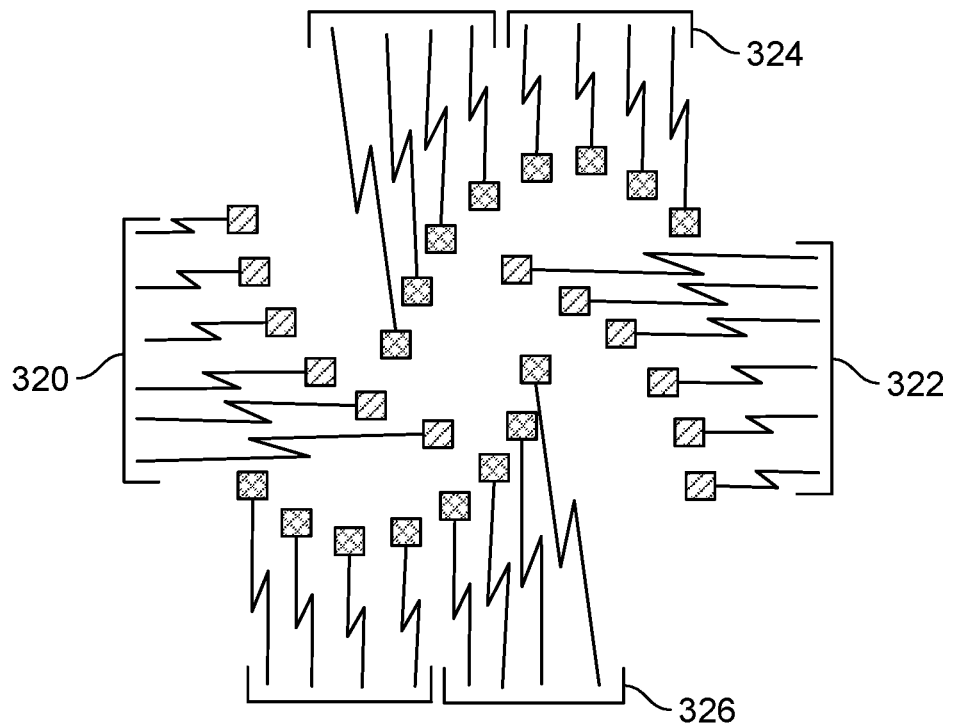
FIG. 3B is a block diagram illustrating an embodiment of an antenna array.

FIG. 3B is a block diagram illustrating an embodiment of an antenna array. In the example shown, the antenna array of FIG. 3B comprises a pair of transmitter antenna arcs of one type (i.e., the set of transmitter antennas 320 and the set of transmitter antennas 322 each form an antenna arc of one type) and a pair of receiver antenna arcs of another type (i.e., receiver antennas 324 and receiver antennas 326 each form an antenna arc of another type). In various embodiments, the set of transmitter antennas comprises N transmitter antennas and the set of receiver antennas comprises M receiver antennas, wherein M and N are integers (e.g., N is three or four and/or M is three or four). In some embodiments, N and M are integers that are equal. In various embodiments, N is 1, 2, 3, 4, 5, 6, 7, 8, 9, 10, 20, 30, 40, 50, or any other appropriate number. In various embodiments, M is 1, 2, 3, 4, 5, 6, 7, 8, 9, 10, 20, 30, 40, 50, or any other appropriate number. Antennas of the antenna array are positioned to achieve a specified FOV and resolution.

Figure 4A:
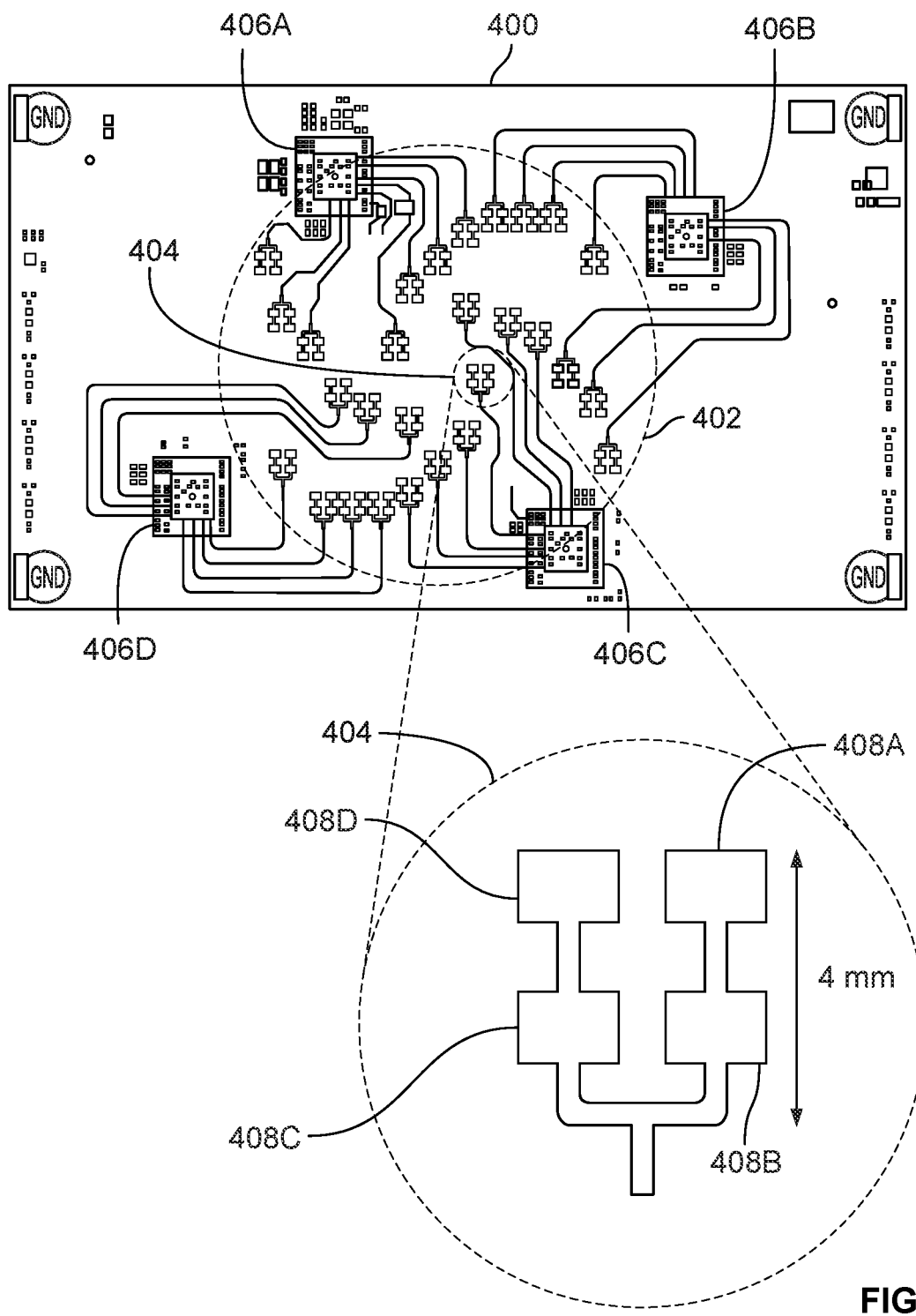
FIG. 4A is a block diagram illustrating an embodiment of an antenna array circuit board.

FIG. 4A is a block diagram illustrating an embodiment of an antenna array circuit. In some embodiments, antenna array circuit board 400 of FIG. 4A is used to implement antenna array 122 and analog radar processor 124 of FIG. 1B. In the example shown, antenna array circuit board 400 comprises antenna array 402, analog radar processor 406A, analog radar processor 406B, analog radar processor 406C, and analog radar processor 406D. Analog radar processor 406A, analog radar processor 406B, analog radar processor 406C, and analog radar processor 406D receive a mm-wave signal (e.g., a radar frequency between 30 to 300 GHz) from antenna array 402 and downmixes the mm-wave signal to produce an intermediate-frequency (IF) signal output (e.g., a frequency in the range 250 KHz to 5 MHz). For example, a mm-wave signal is transmitted by antenna array 402, reflected from a target of interest, and received by antenna array 402 for downmixing and producing an IF signal output. Analog radar processor 406A, analog radar processor 406B, analog radar processor 406C, and analog radar processor 406D digitize the IF signal (e.g., to be used as input to a digital radar processor).

Antenna array 402 comprises a plurality of antennas (e.g., a plurality of antennas of the form of antenna 404). Antenna 404 comprises a plurality of antenna pads. In the example shown, antenna 404 comprises antenna pad 408A, antenna pad 408B, antenna pad 408C, and antenna pad 408D. In some embodiments, an antenna pad of the plurality of antenna pads spans 1 mm×1 mm, or any other suitable dimension to achieve design specifications for a compact antenna array.

Figure 4B:
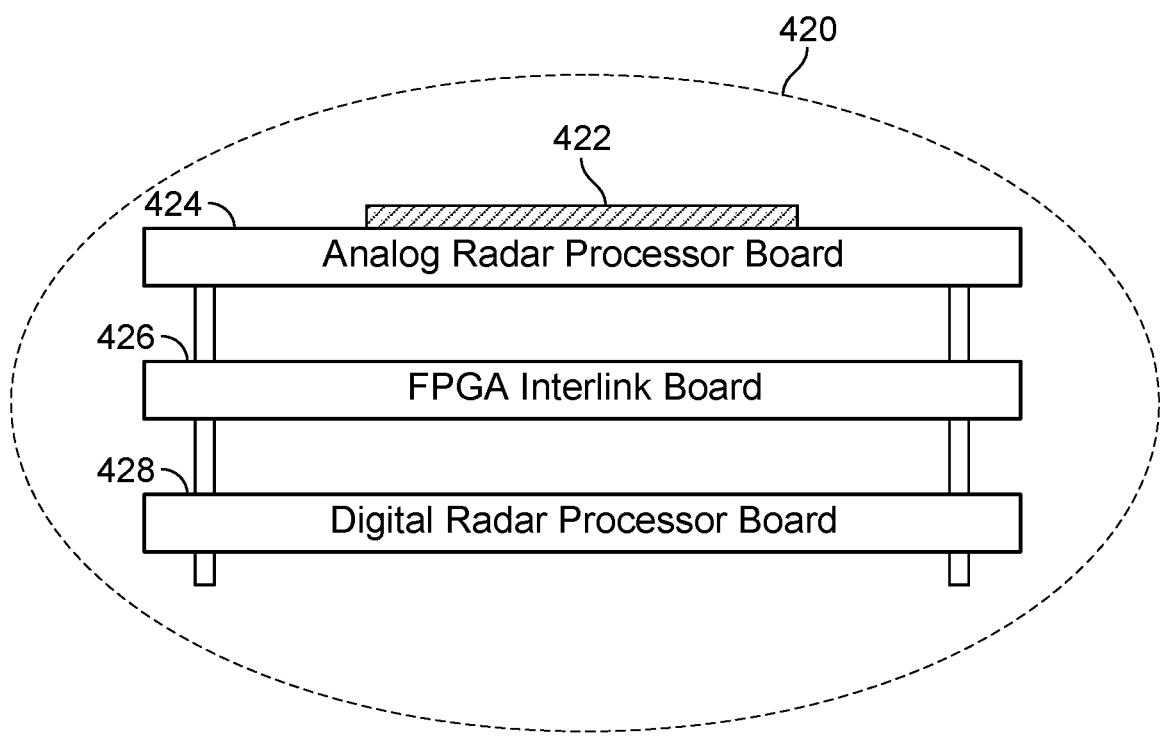
FIG. 4B is a block diagram illustrating an embodiment of a drone radar system.

FIG. 4B is a block diagram illustrating an embodiment of a drone radar system. In some embodiments, radar system 420 of FIG. 4B corresponds to radar system 120 of FIG. 1B. In the example shown, radar system 420 comprises antenna array 422, analog radar processor board 424, FPGA interlink board 426, and digital radar processor board 428. Due to spatial constraints within the counter drone, analog radar processor board 424, FPGA interlink board 426, and digital radar processor board 428 comprise a modular hardware architecture to provide flexibility of design and a compact form factor. In some embodiments, analog radar processor board 424 integrates millimeter wavelength RF and signal processor in a CMOS process. In some embodiments, FPGA interlink board includes interfaces to a drone processor (e.g., an ethernet link or other communication bus connector. In various embodiments, an application-specific integrated circuit (ASIC) is used for one or more of the FPGAs on FPGA interlink board 426. For example, the use of an ASIC as a drop-in replacement to an FPGA provides for power reduction and/or saving circuit board space. Digital radar processor board 428 includes a processor for performing digital signal processing comprising calibration of the radar signal and calculation of amplitude/phases in order to determine range and angles of targets detected using the radar. In some embodiments, the calibration of the radar signal is used to help in accuracy of a determined elevation angle and azimuth angle. In addition, the radar system 420 transmits and receives signals that are used to determine a distance to a target. In some embodiments, the calibration of the radar signal also is used to help in accuracy of a determined distance to a target.

Figure 4C:
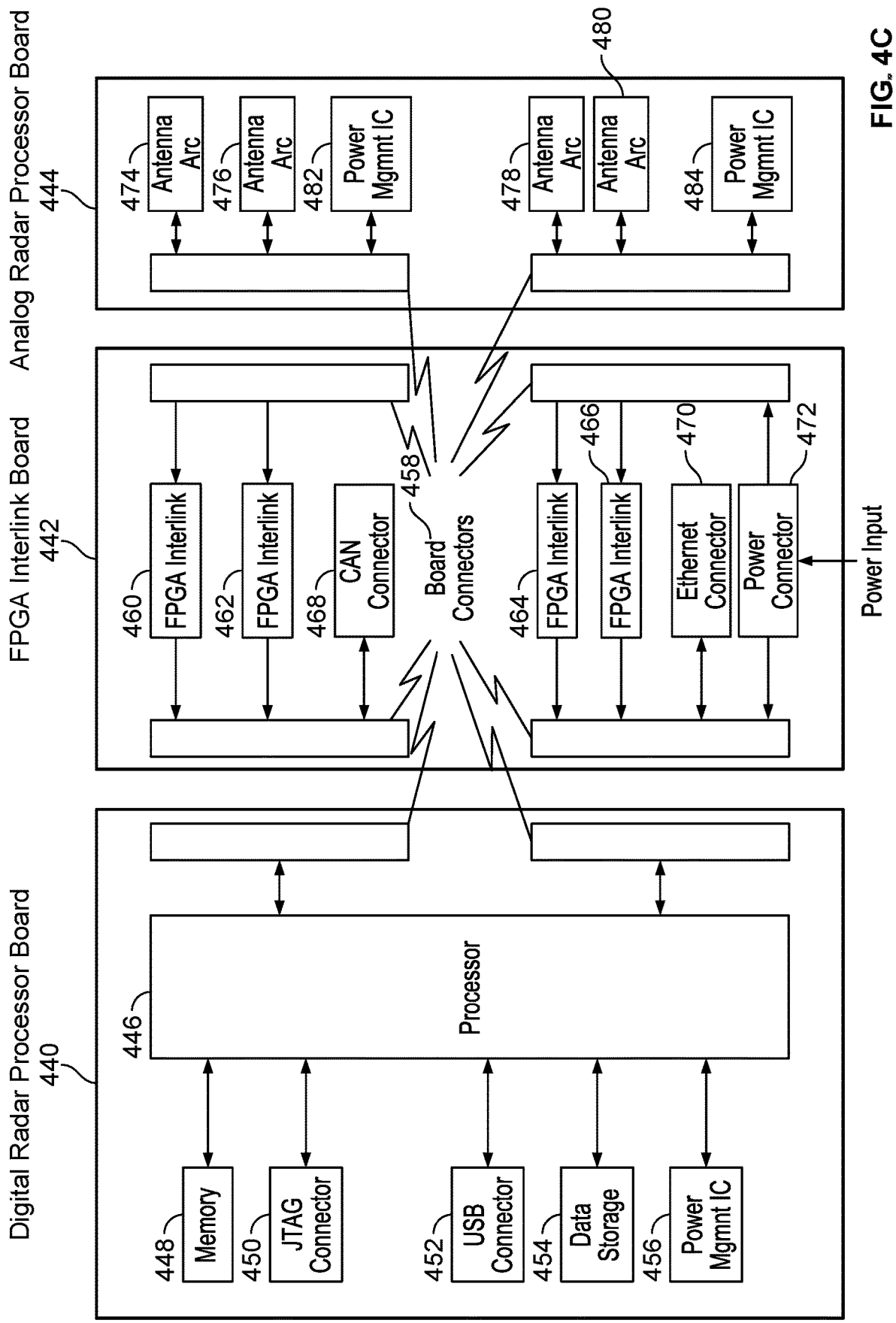
FIG. 4C is a block diagram illustrating an embodiment of a drone radar system architecture.

FIG. 4C is a block diagram illustrating an embodiment of a drone radar system architecture. In some embodiments, the drone radar system architecture of FIG. 4C corresponds to radar system 120 of FIG. 1B. In the example shown, the drone radar system architecture of FIG. 4C comprises digital radar processor board 440, FPGA interlink board 442, and analog radar processor board 444. Board connectors 458 (e.g., 60-pin Samtec QSH type connectors) are used to electrically connect digital radar processor board 440, FPGA interlink board 442, and analog radar processor board 444.

Digital radar processor board 440 comprises processor 446 (e.g., a digital signal processor (DSP) microprocessor chip); memory 448 (e.g., used by processor 446 to store raw sensor data and/or derived sensor information, phase offset calibration data, or any other appropriate data used in the operation of the drone radar system); Joint Test Action Group industry (JTAG standard) connector 450 (e.g., used to communicate directly with processor 446 and/or one or more of the other ICs comprising the drone radar system architecture of FIG. 4C); universal serial bus (USB) connector 452 (e.g., to connect to an external computer or data storage device); data storage 454—for example, a fixed data storage device (e.g., a hard drive, a solid state drive, etc.) or a removable data storage device (e.g., a microSD (Secure Digital industry standard) card, etc.); and power management integrated circuit (IC) 456. Power management IC 456 is used for one or more of the following functions as required by the specifications for the drone radar system: DC to DC conversion, battery charging, power-source selection, voltage scaling, power sequencing, or any other appropriate power management function.

FPGA interlink board 442 comprises four FPGA interlink ICs (i.e., FPGA interlink 460, FPGA interlink 462, FPGA interlink 464, and FPGA interlink 466), controller area network (CAN) connector 464, ethernet connector 470, and power connector 472. The four FPGA interlink ICs connect and convert signals from each antenna arc of the drone radar system antenna array for use by processor 446. In various embodiments, an ASIC is used for one or more of the four FPGA interlink ICs on FPGA interlink board 442. For example, the use of an ASIC as a drop-in replacement to an FPGA provides for power reduction and/or saving circuit board space.

CAN connector 464 is used to connect to a controller area network for transmitting and receiving commands (e.g., returning sensor data, reading contactor states, etc.), and/or for communicating with an external computer or end user (e.g., via ethernet connector 470). For example, an external computer is used during antenna array calibration, system debugging or maintenance, to offload system event logs or diagnostic files, or any other appropriate function to aid an end user in the calibration, operation, or upkeep of the drone radar system. Power connector 472 is used to connect the drone radar system architecture of FIG. 4C to a source of power—for example, one or more rechargeable batteries, or any other appropriate power source that meets the design specifications for the drone radar system (e.g., design specifications for weight, size, battery capacity, etc.).

Analog radar processor board 440 comprises four antenna arc ICs (i.e., antenna arc 474, antenna arc 476, antenna arc 478, and antenna arc 480) and two power management ICs (i.e., power management IC 482 and power management IC 484). The four antenna arc ICs (i.e., corresponding to the four antenna arcs comprising the antenna array of the drone radar system) are each used to receive a mm-wave signal (e.g., a radar frequency between 30 to 300 GHz), downmix the mm-wave signal to produce an intermediate-frequency (IF) signal output (e.g., a frequency in the range 250 KHz to 5 MHz), and digitize the IF signal for transmission to processor 446 via the four FGPA interlink ICs of FPGA interlink board 442. Power management IC 482 and power management IC 484 are used for one or more of the following functions as required by the specifications for the drone radar system: DC to DC conversion, battery charging, power-source selection, voltage scaling, power sequencing, or any other appropriate power management function.

Figure 5:
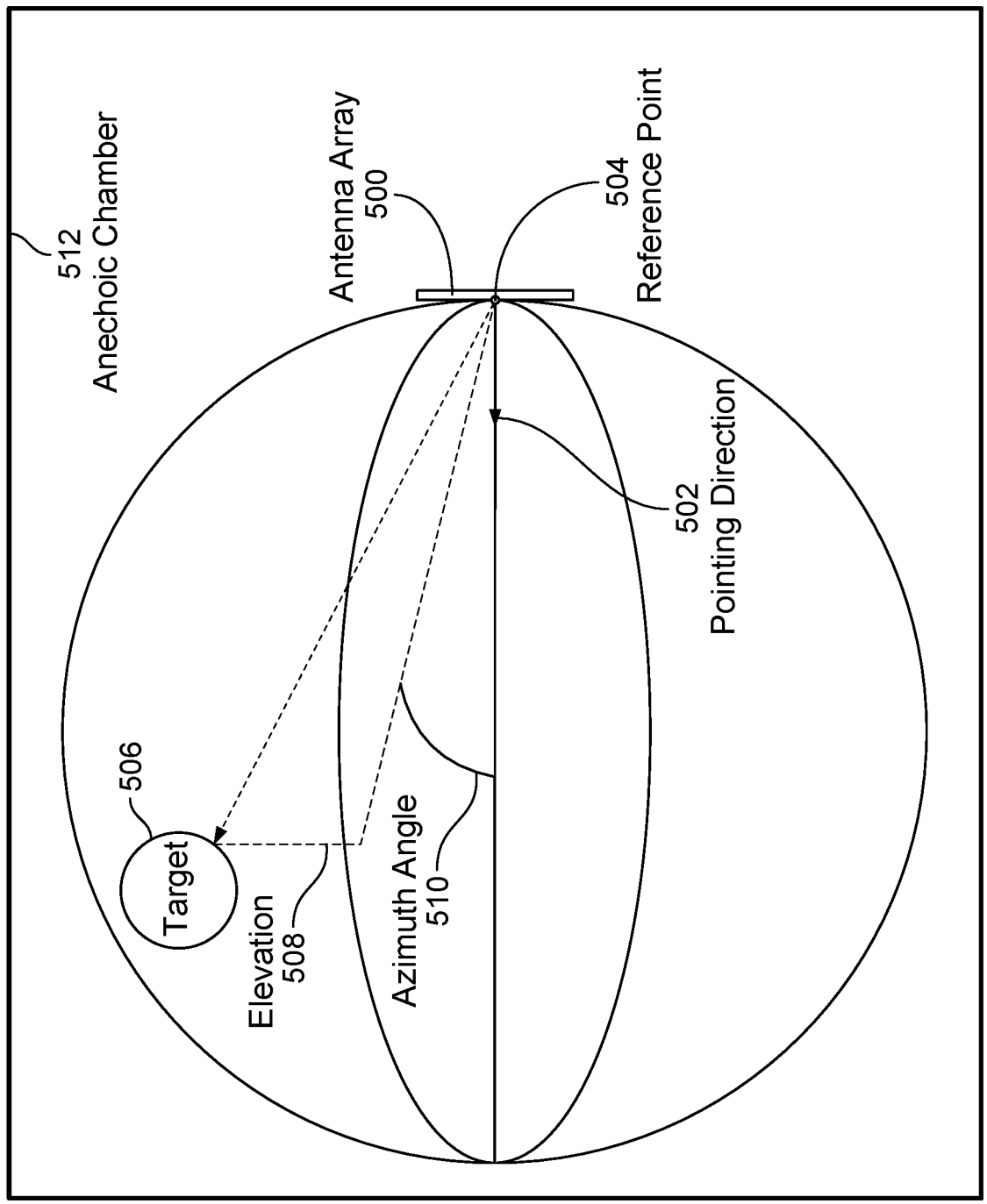
FIG. 5 is a block diagram illustrating an embodiment of antenna array calibration system.

FIG. 5 is a block diagram illustrating an embodiment of antenna array calibration system. In some embodiments, the antenna array calibration system of FIG. 5 is used to calibrate radar system 120 of FIG. 1B. In some embodiments, antenna array 500 corresponds to antenna array 122 of FIG. 1B. In the example shown, antenna array 500 and target 506 are positioned within anechoic chamber 512. In some embodiments, target 506 comprises a corner reflector. For example, target 506 comprises a single corner reflector consisting of three mutually perpendicular intersecting flat surfaces which reflect waves back towards the source. Antenna array 500 is positioned with pointing direction 502 at reference point 504. For example, pointing direction 502 points in a substantially similar direction to the direction that antenna array 500 will point when mounted in a counter drone.

In some embodiments, antenna array 500 is mounted in a counter drone. For example, antenna array 500 is mounted within a radar system that is mounted in a counter drone and positioned within anechoic chamber 512. In some embodiments, antenna array 500 that is mounted in the counter drone is positioned at reference point 504 and is positioned with pointing direction 502 (e.g., with a pointing direction that points to the center of the FOV of antenna array 500, or to any other appropriate pointing direction).

Target 506 is positioned at a plurality of elevations and azimuth angles with respect to reference point 504. In the example shown, target 506 is positioned at elevation 508 and azimuth angle 510. Calibration of antenna array 500 comprises determining an angle of arrival for each transmitter-receiver pair of antenna array 500 for each of the plurality of elevations and azimuth angles. For example, a transmitter of antenna array 500 is caused to transmit towards target 506 while the receiver paired with the transmitter measures the reflected signal from target 506. The analog and digital radar processors associated with the radar system comprising antenna array 500 determine a phase offset of the reflected signal for each receiver as paired with each transmitter of antenna array 500 and determines a transmitter-receiver pair calibration for antenna array 500. This process is repeated for a sufficient plurality of elevations and azimuth angles to encompass the full FOV of antenna 500 at the specified resolution. A calibration offset is then determined by comparing the radar measured angle and range to the target with the known angle and range to the target. This calibration offset is determined for each virtual channel (e.g., transmitter-receiver pair) of the radar array.

Figure 6:
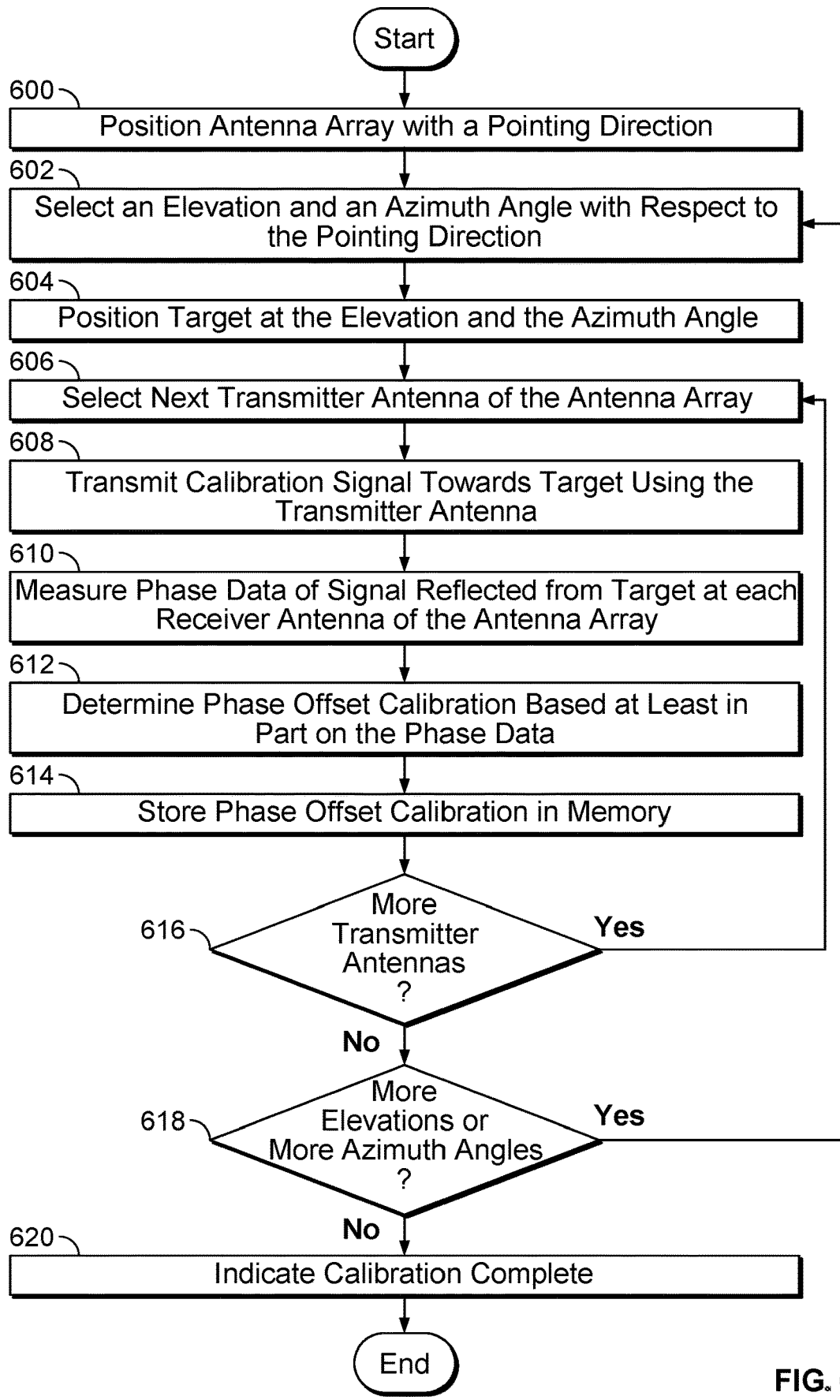
FIG. 6 is a flow diagram illustrating an embodiment of a method for calibrating an antenna array.

FIG. 6 is a flow diagram illustrating an embodiment of a method for calibrating an antenna array. In some embodiments, the process of FIG. 6 is used to implement the antenna array calibration system of FIG. 5. In the example shown, in 600, the antenna array is positioned with a pointing direction. For example, the antenna array is positioned with a pointing direction that points in a substantially similar direction to the direction (e.g., within a degree, a few degrees, 5 degrees, etc.) that the antenna array will point when mounted in a counter drone, with a pointing direction that points to the center of the FOV of the antenna array, or to any other appropriate pointing direction.

In 602, an elevation and an azimuth angle are selected with respect to the pointing direction. For example, an elevation and an azimuth angle are selected from a plurality of elevations and azimuth angles (e.g., a plurality of elevations and azimuth angles sufficient to encompass the full FOV of the antenna array at the specified resolution).

In 604, a target is positioned at the selected elevation and azimuth angle. For example, the target comprises a single corner reflector and is positioned at the selected elevation and azimuth angle. In 606, a next transmitter antenna of the antenna array is selected. For example, a next transmitter antenna of a transmitter-receiver pair of the antenna array is selected.

In 608, a calibration signal is transmitted towards the target using the transmitter antenna. For example, a transmitter of the antenna array is caused to transmit a calibration signal towards the target in order to obtain a reflected signal. In 610, phase data of the signal reflected from the target is measured at each receiver antenna of the antenna array. For example, the analog and digital radar processors associated with the radar system comprising the antenna array determine a phase offset of the reflected signal as measured at each receiver antenna of the antenna array.

In 612, a phase offset calibration is determined based at least in part on the phase data. For example, a transmitter-receiver pair calibration is determined. In 614, phase offset calibration is stored in memory. For example, phase offset calibration data is stored in the digital radar processor memory associated with the radar system comprising the antenna array.

In 616, it is determined whether there are more transmitter antennas. For example, it is determined whether there are more transmitter antennas of the antenna array in need of calibration. In response to determining that there are more transmitter antennas, control passes to 606 and a next transmitter antenna of the antenna array is selected. In response to determining that there are no more transmitter antennas, the process flows to 618. In 618 it is determined whether there are more elevations or more azimuth angles. For example, it is determined whether there are more elevations or more azimuth angles remaining to complete the calibration of a selected transmitter-receiver pair.

In response to determining that there are more elevations or more azimuth angles, the control passes to 602 and a next elevation and an azimuth angle are selected. In response to determining that there are no more elevations or more azimuth angles, the process flows to 620. In 620, it is indicated that the calibration is complete, and the process ends. For example, it is indicated to a user of the calibration system that the calibration is complete, and the process ends.

Figure 7:
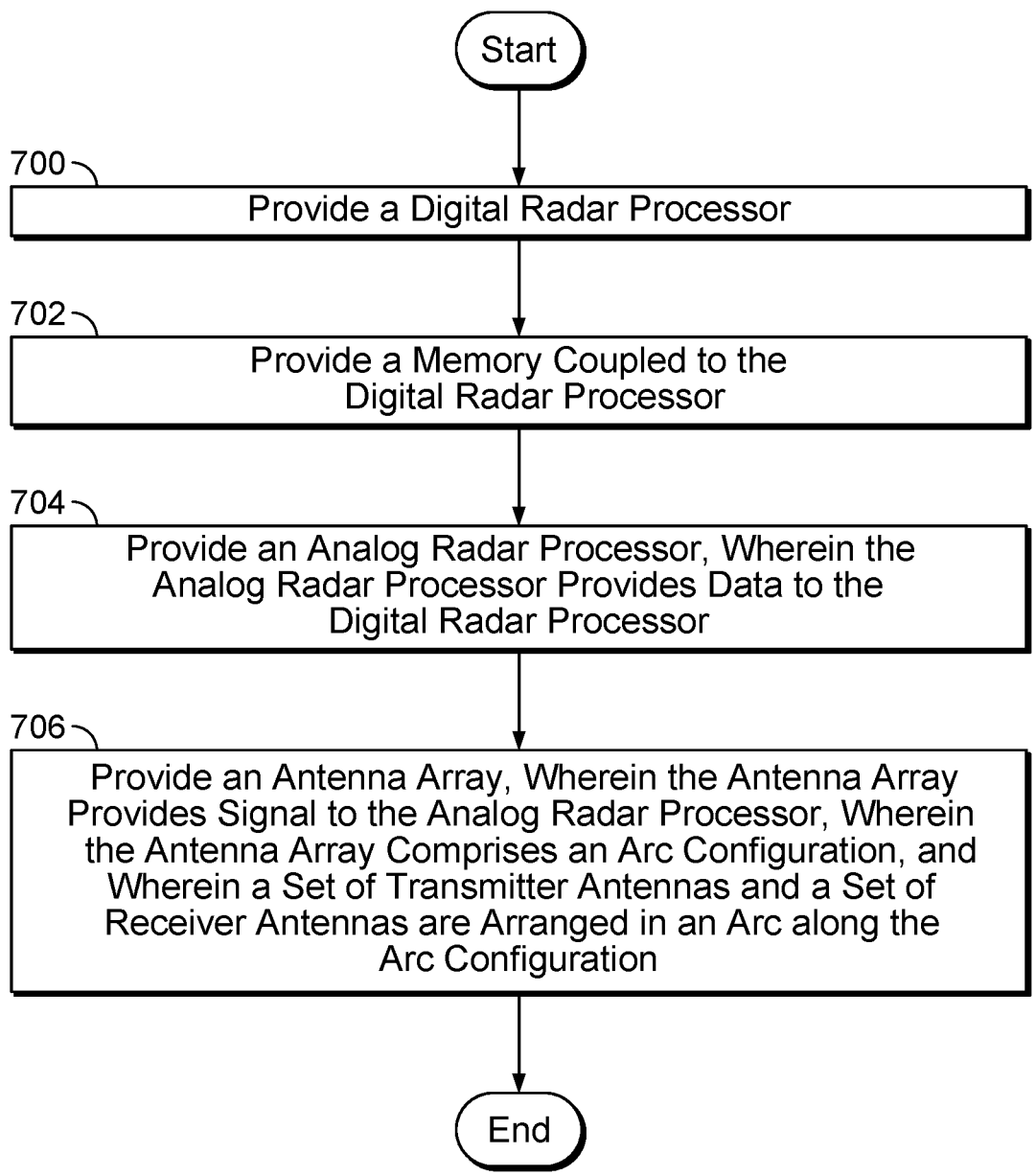
FIG. 7 is a flow diagram illustrating an embodiment of a method for providing a drone radar.

FIG. 7 is a flow diagram illustrating an embodiment of a method for providing a drone radar. In some embodiments, the process of FIG. 7 is used to implement radar system 120 of FIG. 1B. In the example shown, in 700, a digital radar processor is provided. In 702, a memory coupled to the digital radar processor is provided. In 704, an analog radar processor is provided, wherein the analog radar processor provides data to the digital radar processor. In 706, an antenna array is provided, wherein the antenna array provides signal to the analog radar processor, wherein the antenna array comprises an arc configuration, and wherein a set of transmitter antennas and a set of receiver antennas are arranged in an arc along the arc configuration, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for radar, comprising:
    an antenna array,
        wherein the antenna array comprises at least two pairs of non-intersecting arc configurations implemented on a circuit board,
        wherein a set of transmitter antennas and a set of receiver antennas are arranged in a first arc configuration of a pair of the at least two pairs of non-intersecting arc configurations,
        wherein the set of transmitter antennas comprises N transmitter antennas and the set of receiver antennas comprises M receiver antennas,
        wherein a first end of the first arc configuration is positioned on the circuit board closer to a center point of the circuit board than a second end of the first arc configuration,
        wherein a first end of a second arc configuration of the pair of the at least two pairs of non-intersecting arc configurations is positioned on the circuit board closer the center point of the circuit board than a second end of the second arc configuration;
        wherein the first arc configuration and the second arc configuration are not abutting; and
        wherein the first arc configuration and/or the second arc configuration are positioned on the circuit board to not overlap the center point.
2. The system of claim 1, wherein N and M are integers.
3. The system of claim 2, wherein N and M are equal.
4. The system of claim 2, wherein N is three or four.
5. The system of claim 2, wherein M is three or four.
6. The system of claim 1, wherein the at least two pairs of non-intersecting arc configurations comprise a set of arc configurations having a same shape rotated around the center point of the circuit board.
7. The system of claim 1, wherein the at least two pairs of non-intersecting arc configurations include pairs of L types of arc configurations, where L is an integer.
8. The system of claim 7, wherein a first pair of a first type of arc configuration of the L types of arc configurations are positioned rotated around the center point of the circuit board, wherein the first type of arc configurations has a first shape.
9. The system of claim 8, wherein a second pair of a second type of arc configuration of the L types of arc configurations are positioned rotated around the center point of the circuit board, wherein the second type of arc configurations has a second shape that is different from the first shape.
10. The system of claim 9, wherein the first pair of the first type and the second pair of the second type have overlapping antenna elements when rotated 180 degrees.
11. The system of claim 1, wherein an azimuth resolution of the antenna array and an elevation resolution of the antenna array are within +/−50% of each other.
12. The system of claim 11, wherein the azimuth resolution and the elevation resolution are less than 6 degrees.
13. The system of claim 1, wherein an azimuth field of view of the antenna array and an elevation field of view of the antenna array are within +/−10% of each other.
14. The system of claim 13, wherein the azimuth field of view and the elevation field of view are approximately 40, 60, or 80 degrees.
15. The system of claim 1, wherein the antenna array is for radar frequency between 30-300 GHz.
16. The system of claim 1, wherein an antenna pad of the antenna array spans 1 mm×1 mm.
17. The system of claim 1, wherein the set of transmitters is a first set of transmitters, wherein the set of receiver antennas is a first set of receiver antennas, wherein the antenna array comprises a second set of transmitter antennas and a second set of receiver antennas arranged in the second arc configuration.
18. The system of claim 1, wherein the first arc configuration and the second arc configuration have a same shape, and wherein when rotated 180 degrees about the center point, a rotated position of the first arc configuration overlaps an initial position of the second arc configuration.
19. A method for radar, comprising:
    providing an antenna array,
        wherein the antenna array comprises at least two pairs of non-intersecting arc configurations implemented on a circuit board,
        wherein a set of transmitter antennas and a set of receiver antennas are arranged in a first arc configuration of a pair of the at least two pairs of non-intersecting arc configurations,
        wherein the set of transmitter antennas comprises N transmitter antennas and the set of receiver antennas comprises M receiver antennas,
        wherein a first end of the first arc configuration is positioned on the circuit board closer to a center point of the circuit board than a second end of the first arc configuration,
        wherein a first end of a second arc configuration of the pair of the at least two pairs of non-intersecting arc configurations is positioned on the circuit board closer the center point of the circuit board than a second end of the second arc configuration;
        wherein the first arc configuration and the second arc configuration are not abutting; and
        wherein the first arc configuration and/or the second arc configuration are positioned on the circuit board to not overlap the center point.

* * * * *